United States Patent [19]
Kirk

[11] Patent Number: 5,379,133
[45] Date of Patent: Jan. 3, 1995

[54] SYNTHETIC APERTURE BASED REAL TIME HOLOGRAPHIC IMAGING

[75] Inventor: Ronald L. Kirk, Findlay, Ohio

[73] Assignee: ATL Corporation, Findlay, Ohio

[21] Appl. No.: 118,577

[22] Filed: Sep. 9, 1993

Related U.S. Application Data

[63] Continuation of Ser. No. 901,422, Jun. 19, 1992, abandoned.

[51] Int. Cl.⁶ .................. G02B 5/32; G02B 27/22; G03H 1/26
[52] U.S. Cl. ..................... 359/15; 359/22; 359/23; 359/462
[58] Field of Search ............ 359/9, 22, 23, 24, 25, 359/15, 462

[56] References Cited

U.S. PATENT DOCUMENTS

| | | | |
|---|---|---|---|
| 3,586,412 | 6/1971 | Leith | 350/3.5 |
| 3,736,039 | 5/1973 | Hay | 359/23 |
| 3,832,027 | 8/1974 | King | 359/23 |
| 3,942,861 | 3/1976 | George | 359/23 |
| 4,799,739 | 1/1989 | Newswanger | 359/15 |
| 4,993,790 | 2/1991 | Vick | 359/20 |
| 5,112,121 | 5/1992 | Chang et al. | 359/22 |
| 5,117,296 | 5/1992 | Hoebing | 359/22 |
| 5,187,597 | 2/1993 | Kato et al. | 359/22 |

OTHER PUBLICATIONS

"Practical Display Holography", by Graham Saxby, Prentice-Hall International, Ltd., 1988, pp. 228–234, 246–257; 260–272.

*Primary Examiner*—Loha Ben
*Assistant Examiner*—John Juba, Jr.
*Attorney, Agent, or Firm*—Mueller and Smith

[57] ABSTRACT

Apparatus, system, and method is described wherein a synthetic aperture based sequence of image samples are generated with respect to a subject to be stereoscopically imaged. These sample images are presented to the spaced inputs of a holographic integrated combiner screen to be presented at an output aperture in laterally spaced mutual positioning. That spacing is selected, in one aspect, as one-half of the interpupillary distance of human eyes and thus binocular stereoscopic viewing at the aperture is achieved. The combiner screen may be utilized in conjunction with a holographic optical image combiner architecture which additionally employs a lens assembly such as a projecting lens to generate multi-zone outputs, each zone of which may be presented for stereoscopic viewing at a discrete viewing station. Correction for chromatic aberration of the holographic optical components is described.

20 Claims, 4 Drawing Sheets

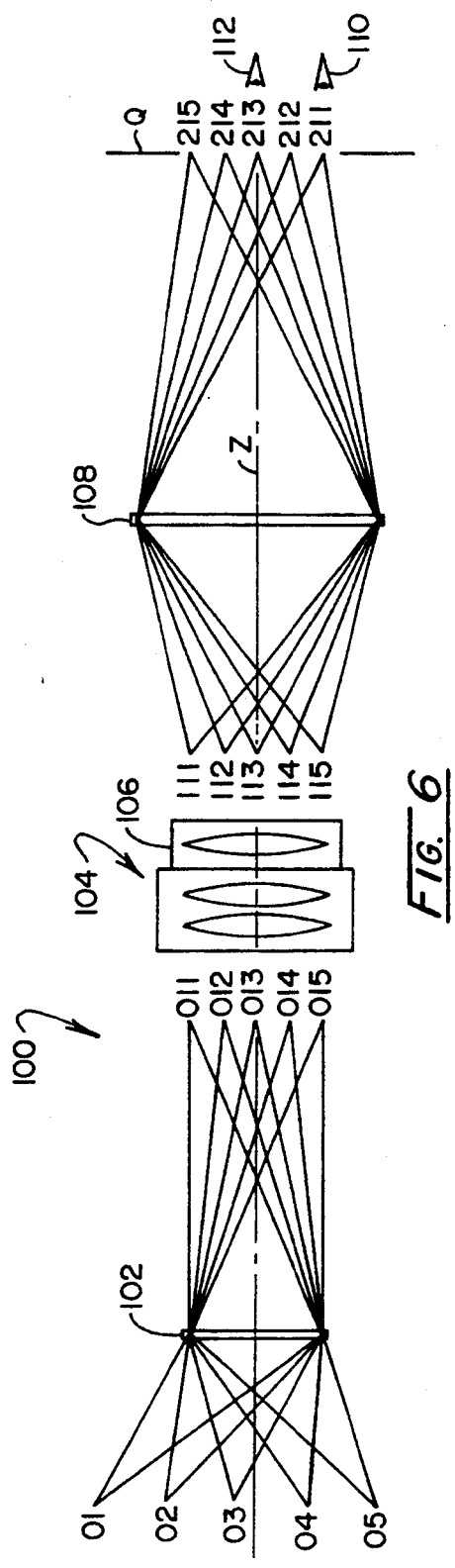
FIG. 6
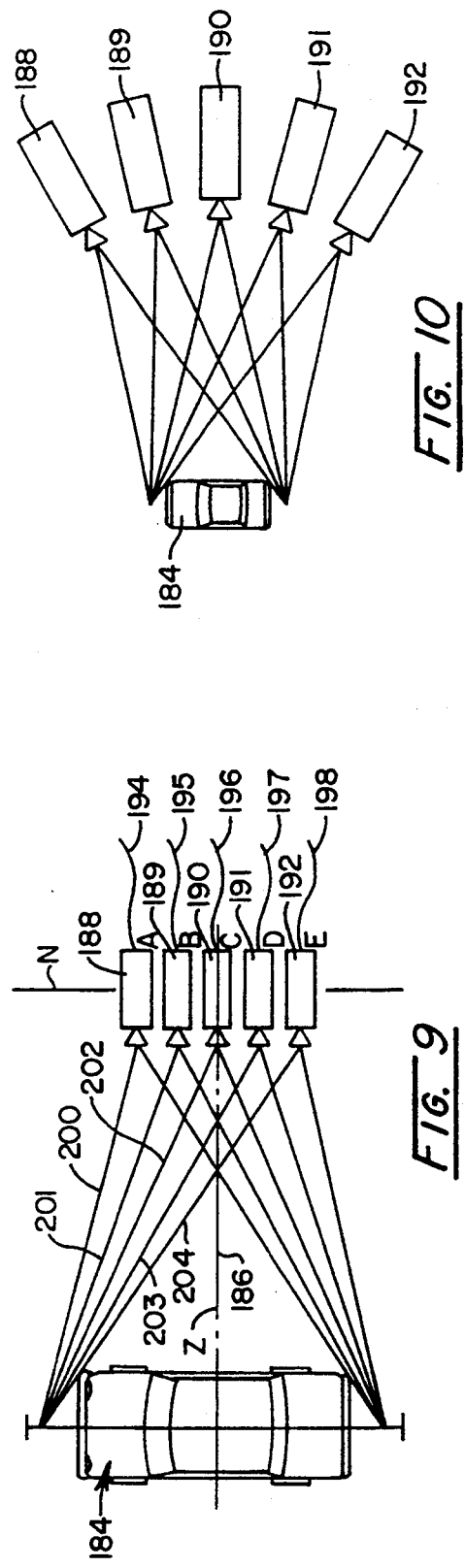
FIG. 10
FIG. 9

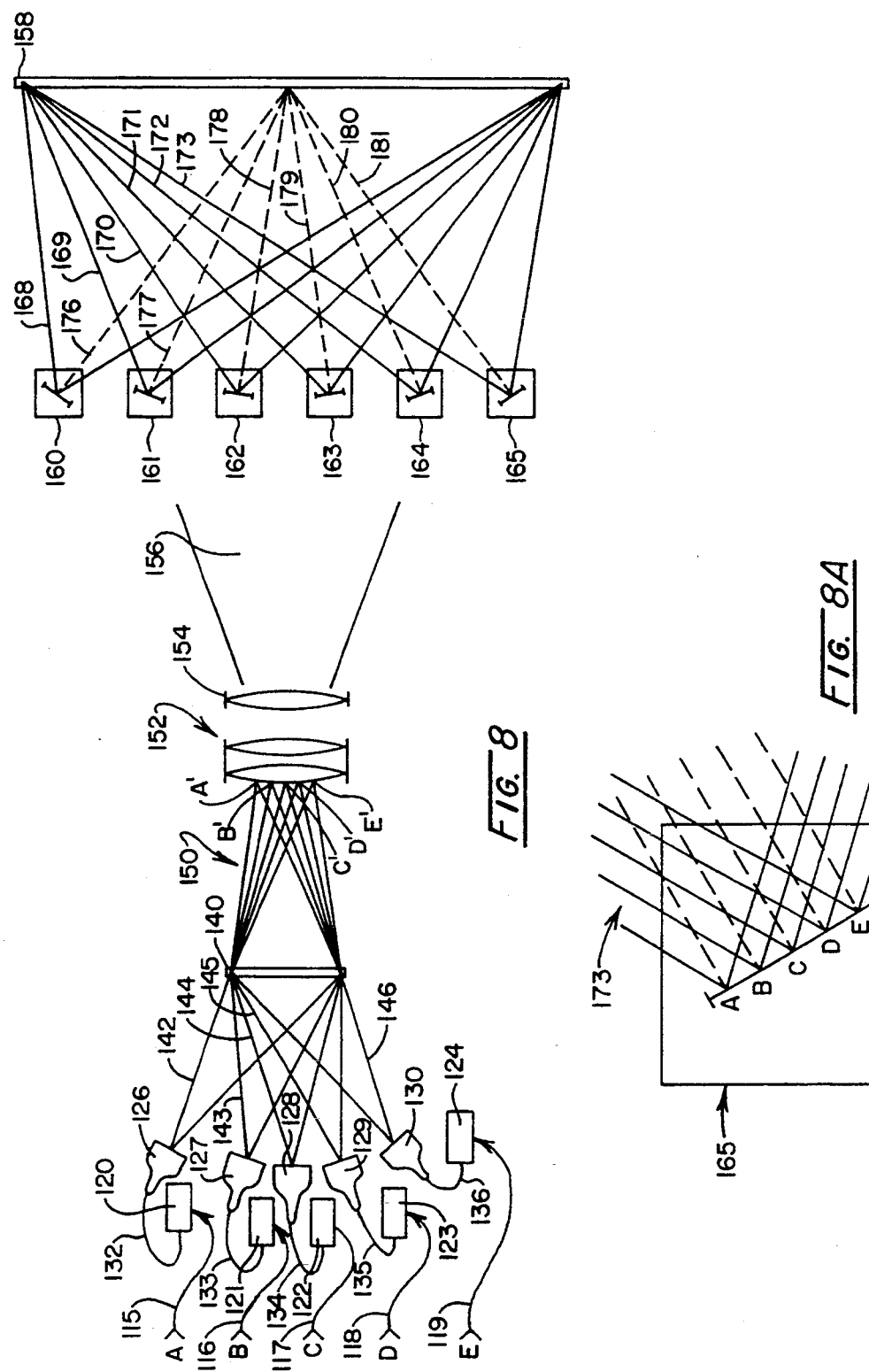

SYNTHETIC APERTURE BASED REAL TIME HOLOGRAPHIC IMAGING

This application is a continuation of U.S. patent application Ser. No. 07/901,422, filed Jun. 19, 1992, now abandoned.

BACKGROUND

The development of the laser and related light stimulative technology has generated a significant interest on the pan of investigators in that branch of interferometry known as "holography". In its underlying concept, holography generally considers that the scattering pattern of light from an object is a transform, or coded record, of the features of that object. Where such a scattering pattern is stored, for example, photographically, an image of the object should be reconstructable. Prior to the availability of an intense coherent light source, a required recordation of such patterns proved most difficult. However, with the availability of the laser as an intense coherent light source and with an innovation wherein the scattering pattern was combined to interfere with a reference beam of coherent light, a photographic wave-front reconstruction was realized. With the interference of reference and reflective subject beams, resultant interference fringes exhibit a recordable contrast representing a measure of amplitude of the subject beam and the position of these fringes represented a recordable measure of phase of the subject beam. Where a photograph of such interference pattern is illuminated with a laser beam identical with the original reference beam, deffracted light from the photograph will have the same amplitude and phase characteristics as the original beam from the subject.

The most interesting aspect of the holographic reconstruction resides in the very detailed and three-dimensional nature of the resultant image. These reconstructions, now referred to as "holograms" have found a variety of uses in commerce and the arts, however, their full potential in evoking three-dimensional images of objects has eluded investigators for many years.

Generally, holographic film technology mandates the vibration free environment of the optical bench or table, a stable platform the size of which is limited by practical constraints. In early holography, this size limitation, as well as the sizing of practical lens components, posed a limitation on the size of the scene being imaged. For example, a building or automobile could not be imaged in a vibration free environment which could only be achieved with an optical bench. Further compounding these imaging difficulties was the necessity for conventional film holography, in achieving appropriate parallax imaging, of deriving an aperture or film plate of dimensions wider and taller than the object being imaged. Confronted with these requirements, investigators turned to the synthetic aperture or synthetic window where imaged samplings, i.e. 35 mm black and white photographic transparencies, of a large object such as a building were made at spaced lateral intervals and radii from a front surface of the object. The samples or photographic slides then were returned to the optical table and imaged with a reference beam onto a holographic plate. This reference beam was angularly located in correspondence with the original angle of the slide to the scene at the time the photograph was made. A similar set-up and exposure ensued for the remaining slides or samples. The resultant holographic plate, when developed and illuminated with a single reference beam, reproduced the images of all the samples in an appropriate spatial disposition to achieve a three-dimensional visualization of the image as seen to a viewer. In this regard, as the viewer moved slightly laterally at the image plane, the eyes, through parallax, synthesize the scene from the different physical perspective as originally generated with the slide photography.

The substantial accuracy or fidelity evolved with film holography also led to the use of holographic recordings as a substitute for actual optical components of an optical system. In many cases, such optical components as now present within a holographic plate become more effective, with respect to utility, than their corresponding more conventional glass optics. This generation of holographic film optics also was enhanced with the generation of thicker emulsions and the like permitting the utilization of a large number of multiple exposures upon a single holographic plate, for example, as may be provided on plates of dichromated gelatin. In particular, advantage has been taken of the capability for recording several optical elements on a single, lightweight holographic glass film plate to achieve very wide field of view lens results which would otherwise be difficult to construct out of classic lens techniques. Leith, in the 1960's developed a highly useful technique for forming improved Fresnel zone plates for improved imaging quality over a wide field of view. See in this regard, U.S. Pat. No. 3,586,412 entitled "Holographic Lens with Aberration Correction" by Leith, issued Jun. 22, 1971.

Other investigators have turned their attention to what has been termed "real time" holography where a spatial light modulator is electronically driven to achieve an electronic reconstruction and display of a three-dimensional holographic image. Through resort to highly miniaturized grid matrix technology, the fringe pattern itself is constructed electrooptically. Such technology is, for example, described in U.S. Pat. No. 4,484,219 by Kirk, entitled "Electronically Generated Holography", issued Nov. 20. 1984. Improvements to the spatial modulator component of this technology described in U.S. Pat. No. 4,566,031 by Kirk, entitled "Spatial Light Modulation with Application to Electronically Generated Holography", issued Jan. 21, 1986.

A somewhat broad range of commercial entities have shown an interest in some form of practical 3-D presentation of objects. This interest has been enhanced by advances in computer graphics, where investigators have achieved refined levels of 2-D imaging including the computer generation of rotatable perspective views, a feature sometimes referred to as 2½-D display. The value of such displays, particularly as generated in three dimensions, can be compared to the three-dimensional value of a partially completed sculpture to the sculpting artist. As a work of art gradually is formed, the artist, in effect, has the advantage of a continuous three-dimensional image of the work as it progresses to a final product such as a statue. Such 3-D information is far superior to the artist than a two-dimensional representation or a 2½-D representation. These three-dimensional feedback needs easily extend from art to industry where the design of an article of manufacture such as an automobile or pan therefor, airplanes, and the like including architectural renderings typically are modeled to achieve a three-dimensional representation before final design is evolved. Three-dimensional holography, for example united with the improvements in computer graphics, holds promise to greatly enhance the capabilities of the industrial design artist.

SUMMARY

The present invention is addressed to a system, method, and apparatus for providing real time or dynamic holographic imaging with equipment of substantially reduced complexity. Combining synthetic aperture techniques with a creation of customized holographic optical elements, stereoscopic imaging is achieved with image inputs generated, for example, from cathode ray tubes carrying video images of the scene or images generated with computer graphics. With the system, image output aperture zones may be provided such that viewing may take place simultaneously at a number of viewing stations or positions.

As one aspect of the invention, a holographic integrating combiner screen or component is provided which is formed of a number of fringe pattern defined optical components having a corresponding number of spaced apart back focal planes or points, each of which transmits an image sample from a synthetic aperture group of samplings to a forward focal point at an output aperture. These output positions are spaced mutually, laterally to achieve a binocular perspective viewing at a zone located at one or more viewing stations.

As another aspect of the invention, a holographic optical image combiner or component is produced which is employed with the holographic integrated combiner screen in conjunction with a lens assembly to produce the noted binocular perspective viewing at an output aperture. The optical combiner may be employed to produce a multiplicity of zones each carrying the binocular perspective image component such that a multitude of viewing stations may be utilized. Additionally, this component may be formed of reflective optical components and employed in conjunction with projection optics functioning to project the spaced images generated from the holographic integrated combiner screen. As a consequence, the system may be used to generate three-dimensional images for a theater environment without the utilization of stereoscopic glasses and the like heretofore required for such entertainment media.

As another feature, the invention provides a planar holographic film combiner component having a centrally disposed axis extending outwardly normally thereto. The component is constructed having at least two holographic optical lens components thereon having back focal lengths extending to spaced apart image receiving positions offset from the central axis. The holographic optical lens components also have forward focal lengths extending generally oppositely to focal points spaced apart in mutual adjacency to define an output aperture for generating a binocular parallax view of synthetic aperture derived images provided at the image receiving positions.

As another feature, the invention provides an imaging system for stereoscopically imaging an array of at least two discrete synethic aperture derived images of an object. The system includes a first planar holographic film component having a centrally disposed axis extending outwardly normally thereto which is constructed having at least two fringe pattern derived first optical components thereon with back focal lengths extending to spaced apart first image receiving positions located at predetermined positions offset from the axis for receiving the synthetic aperture derived images and having forward focal lengths extending generally oppositely from the first components to first focal points spaced apart a first predetermined distance to define a first output aperture. A second holographic film component is provided which is constructed having fringe pattern derived second optical components thereon corresponding in number with the first optical components. These second optical components are configured having back focal lengths extending to second image receiving positions located to receive images transmitted by the first optical components and have forward focal lengths extending from the second optical components to second focal points within a viewing aperture zone. The second optical components are provided having a magnification factor with respect to the first predetermined distance to provide the second focal points at a lateral spacing corresponding with one-half of the interpupillary distance between the eyes of a human.

As another feature, the invention provides a method for generating a stereoscopic image of a subject which comprises the steps of:

generating a spatial sequence of a predetermined number of images of the subject from a corresponding sequence of laterally spaced, select imaging positions, the sequence of images defining a synthetic aperture;

providing a holographic film combiner component, having a centrally disposed axis extending outwardly normally therefrom, constructed having a number of holographic optical lens components corresponding with the predetermined number of images, the holographic optical lens components having back focal lengths extending to spaced apart image receiving positions offset from the axis and having forward focal lengths extending generally oppositely to focal points spaced apart in mutual adjacency at an output aperture an amount corresponding with one-half of the interpupillary distance between the eyes of a human;

locating a viewing station at the output aperture; and projecting select images simultaneously in the generated sequence at a corresponding sequence of the spaced-apart image receiving positions to effect their corresponding projection at the output aperture.

Still another feature of the invention is to provide a method for generating a stereoscopic image of a subject, comprising the steps of:

generating a sequence of a predetermined number of images of the subject from a corresponding sequence of laterally spaced, select imaging positions, the sequence of images defining a synthetic aperture;

forming a first holographic film component having a centrally disposed axis extending outwardly normally thereto, constructed having a number of first optical components corresponding with the predetermined number of images, the first optical components having back focal lengths extending to spaced apart image receiving positions offset from the axis and having forward focal lengths extending to focal points laterally spaced apart in mutual adjacency a predetermined distance at a fast output aperture;

forming a second holographic film component constructed having a number of second optical components corresponding with the number of first optical components, the second optical components having back focal lengths extending to second image receiving positions and having forward focal lengths extending from the second optical components to second focal points within a viewing aperture zone, the second optical components having a magnification factor with respect to the first predetermined distance to provide the second focal points at a lateral spacing corresponding with one-half of the interpupillary distance between the eyes of a human;

positioning the second holographic film component to locate the second receiving positions for receiving images transmitted from the first optical components at the fast optical output aperture;

locating a viewing station at the viewing aperture zone; and projecting select images simultaneously in the generated sequence at a corresponding sequence of spaced-apart first holographic film component image receiving positions to effect their corresponding presence at the viewing aperture zone.

Other objects of the invention will, in part, be obvious and will, in part, appear hereinafter.

The invention, accordingly, comprises the apparatus, system and method possessing the construction, combination of elements, arrangement of parts, and steps which are exemplified in the following detailed disclosure. For a fuller understanding of the nature and objects of the invention, reference should be had to the following detailed description taken in connection with the accompanying drawings.

BRIEF DESCRIPTION OF THE DRAWINGS

FIG. 6 is a schematic top view of an imaging system according to the invention utilizing a holographic integrated combiner screen within a holographic optical image combiner architecture according to the invention;

FIG. 8 is a schematic top view of a holographic projection system employing the components of the instant invention;

FIG. 8A is a top partial schematic view of the discrete image outputs derived at a zone shown in FIG. 8;

FIG. 9 is a schematic top view of a video camera synthetic aperture generation of sampling images; and FIG. 10 is a schematic top view of another camera arrangement for synthetic aperture generation.

DETAILED DESCRIPTION OF THE INVENTION

The approach to the production of variable three-dimensional images of the present invention is one combining the aspects of holographic optical elements with synthetic aperture techniques. Thus combined, the evolved imaging system avoids the substantial complexity of earlier holographic imaging of dynamic subjects. As a prelude to considering the techniques, system, and apparatus of the invention, the techniques for creating holographic optical components is reviewed in conjunction with FIGS. 1-5.

Figure 1:
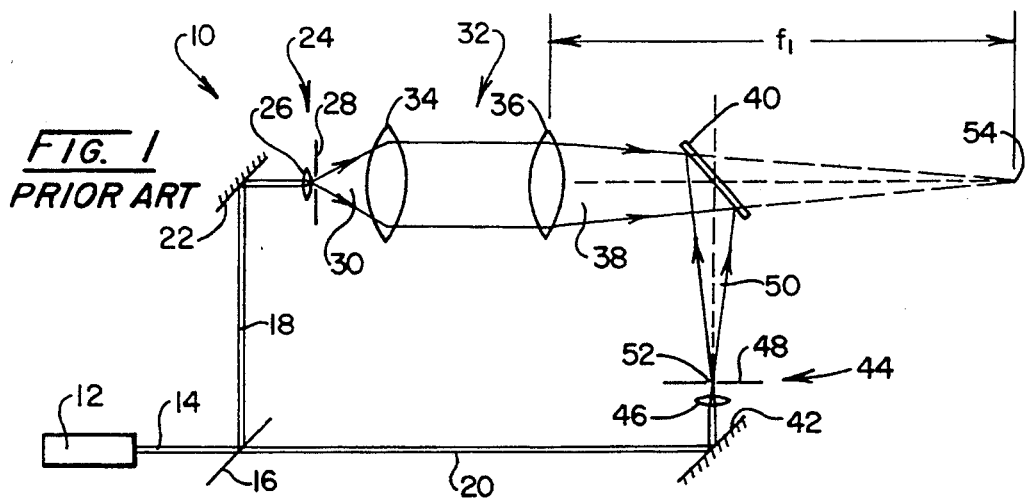
FIG. 1 is a schematic representation of one configuration for producing holographic optics as taught by the prior art.

Referring to FIG. 1, one approach to the recordation of a holographic lens described by Leith (supra) is schematically represented and identified in general at 10. The set-up 10 includes a source of coherent radiation such as a laser 12 which is seen to emit a narrow beam of coherent light 14 which strikes a beam splitter 16. Beam splitter 16 causes the intensity of the beam 14 to be substantially equally divided between a beam 18 and a beam 20. Light beam 18 is reflected from a mirror 22 to be directed through a spatial filter represented at 24 seen comprised of a lens 26 and pinhole filter 28. The resulting clean diverging beam 30 is introduced to optics 32 including a collimating lens 34 and a beam converging lens 36. The resulting converging light beam is shown at 38 being directed toward a holographic film plate 40 and will be seen to create a converging pattern with a focal length of $f_1$. Note the angular inclination of this holographic plate 40. Beam 20 is seen to be reflected from a mirror 42 into a spatial filter 44 comprised of a lens 46 and a pinhole filter 48 positioned at the focal length of lens 46. A resulting clean diverging reference light beam 50 then is directed to the holographic recording plate 40. The output of the spatial filter 44 creating this reference beam 50 may be represented at point 52. Plate 40 will record a fringe pattern capturing the converging and diverging qualities of the two beams 38 and 50. In effect, a Fresnel zone plate or patterns of waves is created at the plate 40 which is developed using conventional holographic film techniques.

Figure 2:
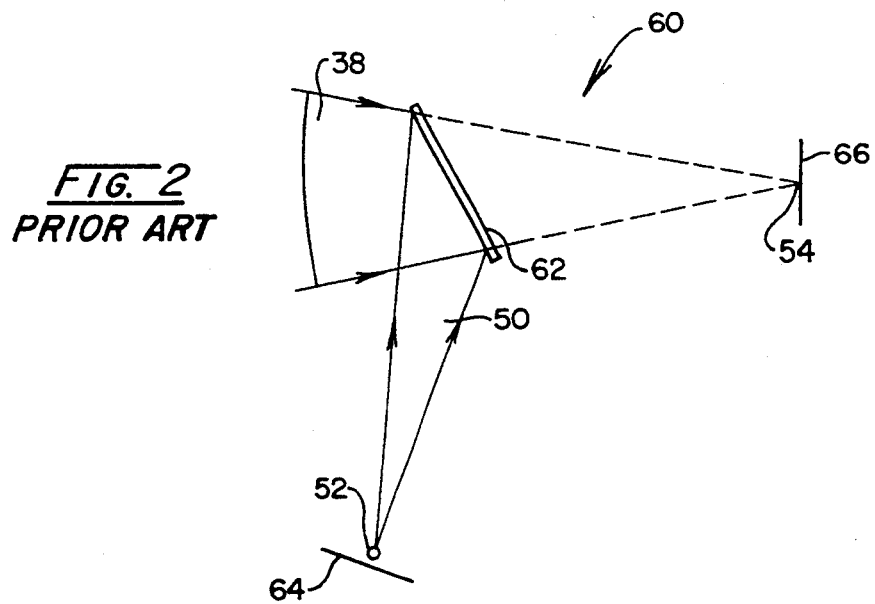
FIG. 2 illustrates the imaging properties of an optical component such as a Fresnel zone plate constructed in accordance with the teachings of the prior art.

Referring to FIG. 2, the use of the holographic plate 40 following its being developed is illustrated in the set-up represented generally at 60. Here the now developed holographic plate 40 appears at 62. Supplied to the plate 62 is the original reference beam 50 again represented by that number and in the same relative angular disposition as described in conjunction with set-up 10. Emanating from the plate 62 then is a converging beam path identical to that described at 38 in conjunction with set-up 10 and again represented by the same numeration in FIG. 2. In effect, the holographic plate 62 is acting as lens, i.e. as a Fresnel zone plate, with an input angular extent according to beam 50 which is identical to the originally recorded angle of beam 50 in set-up 10. The output, as noted, will correspond with the output of the original beam 38 after it had intersected the plate 40, the beam now emanating from the plate 62 to a focal point 54 corresponding with the focal point 54 of set-up 10 and at the corresponding focal length, $f_1$.

For the instant example, one may place an image manifested, for example, as a photographic transparency, or by reflective illumination such as represented by the image defining line 64 at the point 52 of the spatial filter 44 described in conjunction with set-up 10. That image at 64 will appear to be imaged at a plane or point represented by line 66 in the same manner as if holographic plate 62 were a lens. However, a particular advantage for the applications of the present invention are derived in that the system is able to image at roughly a 45° angle as represented by the relative angular relationship between image object 64 and image 66.

Figure 3:
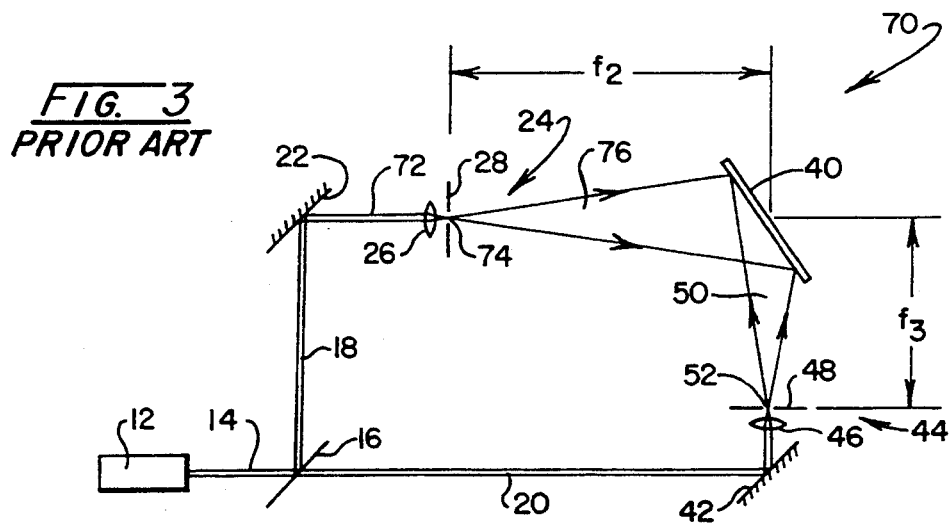
FIG. 3 is a schematic representation of another prior art method for holographically constructing holographic optics.

Referring to FIG. 3, an approach to the creation of optics emulating plate 40 preferred with the instant invention, is revealed generally as a set-up 70. In the interest of simplicity, the same numeration as utilized in conjunction with FIG. 1 is employed in FIG. 3 where the components have not been altered. Accordingly, a coherent source 12 is seen projecting a beam 14 to a beam splitter 16. A resultant beam 20 extends to a mirror 42 whereupon the beam is redirected through a spatial filter 44 having a lens 46 and pinhole filter 25 to present an output point 52 for a beam 50. Beam 50 is seen diverging and impinging upon the holographic film plate 40. Set-up 70 is seen to utilize two diverging beams. In this regard, the beam 18 as reflected at 72 from mirror 22 is introduced through spatial filter 24, again comprised of lens 26 and pinhole filter 28 to provide a point of beam source 74 creating the diverging beam 76. Beam 76 impinges with beam 50 at the holographic plate 40 to generate an interference pattern emulating an optical lens.

Figure 4:
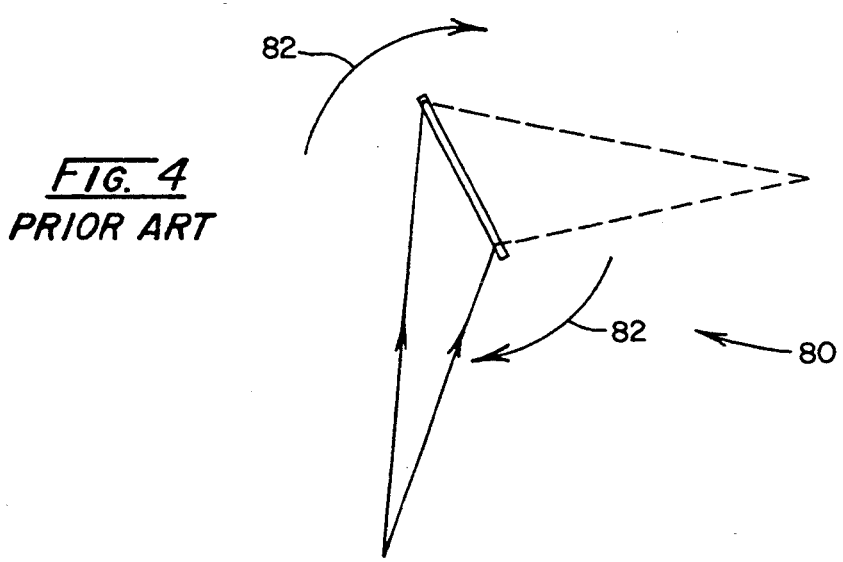
FIG. 4 is a diagram illustrating the imaging properties of a holographic optical component constructed according to the configuration of FIG. 3.

Referring to FIG. 4, the reconstruction of the set-up 70 is represented at 80. The only difference in this reconstruction set-up 80 with respect to that described in FIG. 2 at 60, is the requirement that the plate 62 (now plate 40) be rotated. Accordingly, an identification of arrows indicating 180° rotation is shown at 82. Because of the utilization of dual diverging beams in the creation of the set-up 80, the rotation is required to produce the conjugate of the pattern, i.e. a converging beam upon reconstruction. The advantage of the embodiments of set-ups 70 and 80 resides in the utilization only of the spatial filter 24 for generating the principal diverging beam. In the technique of FIG. 1, a sufficiently large diameter lens for the optics 32 is required to supply a full beam width to the holographic plate 40. That same beam width must be developed in conjunction with an optical focal length long enough to allow the reference beam 50 to intercept the plate 40 at an appropriate angle to create necessary interference patterns. Generally, where, for example, a holographic plate having dimensions of 8 inches × 10 inches with a hypotenuse of about 13 inches, there would result in the requirement for a lens of 26 inches in diameter to produce a requisite fringe pattern. Such an arrangement generally is unwieldy as well as cost prohibitive. By contrast, the embodiment of FIGS. 3 and 4 requires only smaller spatial filter lenses as at 26 and 46.

Returning to FIG. 3, the focal length of the recordation system between spatial filter 24 point 74 and the center of plate 40 is seen designated as $f_2$. Correspondingly, the focal length represented as the distance between point 52 of spatial filter 48 and the plate 40 is represented as $f_3$. As a rule of thumb, for a focal length, $f_2$, of the desired emulated optic system, then the focal length, $f_3$, should represent one-half of the focal length, $f_2$. Thus, the designer readily can determine the focal length necessary in combination for a construction set-up to create a desired output focal length. The relative positioning of the beams with respect to each other during this construction can be seen to be dependent upon a need to avoid seeing an actual image generator when looking through the holographic plate or screen and with respect to the necessity of evolving perspective and off-axis positioning.

For a further discourse concerning the instant subject matter, reference is made to: "Practical Holography", by Graham Saxby, Prentice Hall International Ltd., pp 228–234.

Figure 5:
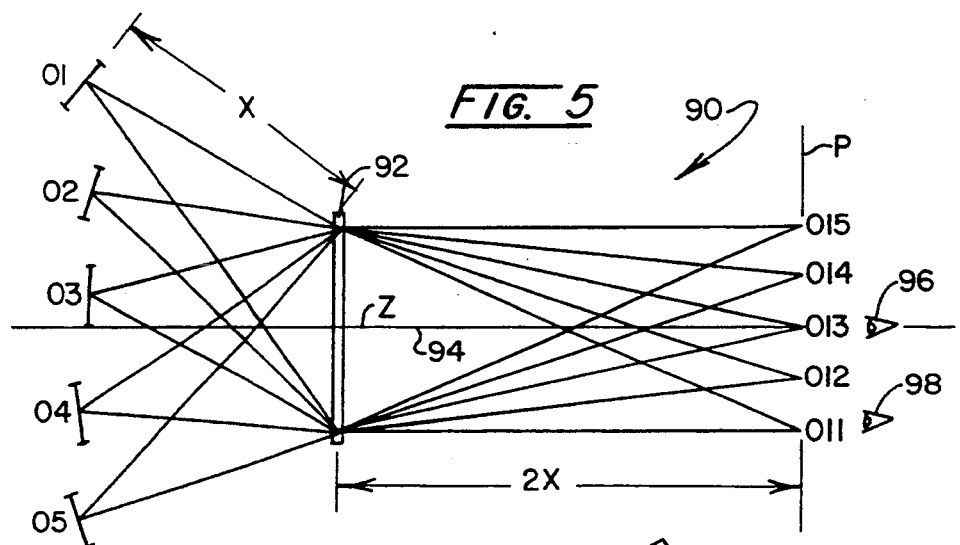
FIG. 5 is a top schematic view of a holographic integrated combiner screen or component constructed according to the invention.

In accordance with the invention, a holographic integrated combiner screen (HICS), is created. With this component, a three-dimensional scene may be generated using the synthetic aperture techniques discussed above and multiple input perspective images which may be generated, for example, utilizing the techniques of FIG. 3. Referring to FIG. 5, a ray trace diagram of a combiner screen (HICS) is represented generally at 90. This arrangement 90 is shown in a reconstruction condition wherein the holographic plate, now shown at 92, has been produced, preferably in accordance with the technique described in conjunction with FIGS. 2 and 3; has been appropriately rotated; and may be considered in conjunction with a centrally-disposed axis labeled "Z" and represented at axis line 94. To promote the clarity of the discussion at hand and descriptions to follow, a ray trace identification protocol is utilized wherein progressive imaging positions which are related or continuous are given the same arithmetic sequential numbering, i.e. 1–5, but for each stage in the ray trace evolution, their values are increased first by tens, then by hundreds, and then by simple multiplication to provide a sequence such as: 01, 11, 111, 211, etc. Set-up 90 in FIG. 5 is shown as a top view which indicates that the combiner holographic plate 92 has been formed by recording on it a sequence of optical elements or optical holographic lenses. The back focal lengths of this plate 92 extend to spaced apart receiving positions and there also is shown an output herein represented as extending to an output aperture at a plane, P.

Five optical elements are represented in the set-up 90 having back plane focal points or receiving positions labeled, respectively, 01–05. These originating focal points are displaced from the plate axis Z such that a viewer looking into the axis Z from the output side aperture, i.e. at plane P, will not see image generating elements which may be positioned at points 01 to 05. Accordingly, points 01 and 05 are laterally or horizontally displaced from the axis Z, while focal positions 02–04 are displaced vertically recalling that a top view is represented in the figure. The lens elements having back focal positions 01, 05 are configured such that their outputs are present at plane P and are respectively labeled 011–015. When an image generating component such as a cathode ray tube (CRT), video tube or transparency is positioned at the back plane focal points 01–05 and where they are presenting images which have been developed to achieve a binocular perspective view to a viewer, then an observer at plane P will see a stereoscopic image on the condition that the spacing of the output positions 011–015 is half the normal interpupillary distance of the human eyes, i.e. about 3.5 cm. In this regard, a left eye station symbol is shown at 98 in FIG. 5 as being positioned at output point 011 and the viewer's right eye is shown at 96 by a right eye station symbol positioned before output point 013. The viewer thus may perceive a three-dimensional representation evoked using perspective techniques and an artificial aperture form of preliminary imaging. Three different views will be seen in the exemplary five input demonstration of the set-up 90, the observer seeing the object image in three-dimensional virtual space, plate 92 now functioning as a volume screen. For the case of computer graphics or animation, the observer will see a three-dimensional object suspended in space which may appear to move forward or rearwardly in space and which may be manipulated utilizing conventional computer graphic techniques. It may be observed that the set-up 90 is one intended for a single viewer and that the focal length of the optics recorded at plate 92 may provide, for a back focal length as generally represented at x having one value, while the focal length evolved at the output and presented at plane P may be double that or 2× as illustrated. These outputs 011–015 need not be present in a singular plane but may be varying to suit the needs of a particular set-up design. The size of the combiner plate 92 may be of practical scope. For example, screens of 30×40 cm can be formed on an optical table or bench of dimensions of about 4 ft×6 ft. It may be observed that the set-up 90 utilizes the plate 92 as a direct viewer screen. The HICS component 90 will be seen to function additionally as a component of more elaborate three-dimensional imaging systems. While five lens elements having back focal points 01–05 have been illustrated in conjunction with FIG. 5, it will be apparent that this number can be varied from a more primitive embodiment of only two lens elements to a substantial number serving to enhance the quality of a resulting three-dimensional image at plane P or at those image observing locations provided by the design. In general, the number of such elements will be limited by the number of recordations which can be made upon the holographic film plate, for example currently about 16 of such components can be recorded. While the holographic combiner plate 92 has been shown as a transmission device, it may be generated as a reflecting optical component.

A discourse concerning holographic stereograms is provided in "Practical Holography", supra, pp. 246–257.

Turning to FIG. 6, the HICS approach discussed in connection with FIG. 5 reappears but in a more miniature form within a holographic optical image combiner (HOIC) architecture. In the figure, the combiner plate as earlier discussed at 92 in FIG. 5 appears as a combiner plate 102 having lens components with beam ray traces extending, as before, to back plane points 01–05. However, the output beams for these components 01–05 as at 011–015 now are mutually displaced by a relatively small amount and are positioned at the entrance optics of a field lens assembly represented generally at 104 and having, for example, a moving focusing element represented at 106. The center of plate 102 is seen to be intersected by the optical system Z axis as is the field lens assembly 104. The output of assembly 104 is a continuation of the focal points 011–015 now represented at respective back focal points 111–115. These back focal points are developed from a multi-optical element holographic plate 108, or a combination of such plates, the corresponding forward optical points of which are seen presented at a plane Q as respective points 211–215. The lateral spacing between forward plane focal points 211–215 is selected, as before, as one-half the interpupillary distance or about 3.5 cm. Accordingly, a viewer at, for example, eye stations 110 and 112 will perceive through the holographic viewable aperture at plane Q a three-dimensional image formed of the perspective components imaged at respective points 211 and 213. For the five component demonstration at 100, three such stereoscopic views will be available to the viewer as the head is moved laterally before the aperture at plane Q.

The field lens assembly 104 affords the instant optical system a focusing flexibility which is quite useful as the systems are scaled up in size, for example, to achieve a multi-viewer station capability.

To configure the HICS device 102 to achieve the requisite half interpupillary spacing of discrete images at plane Q, it is necessary to provide the initial lens component designs at combiner plate 102 in correspondence with the magnification of optical system 104 and the holographic multi-lens component plate 108. By way of example, if the magnification of the optics assembly 104 is 4 and the magnification evoked at the recorded screen 108 is 2, a total magnification of 8 is developed in the system. Accordingly, for half pupillary spacing of the elements 211–215 at plane Q, the spacing of corresponding focal points 011–015 should be 3.5 cm/8 or 0.4375 cm. As before, it is necessary that the back focal point positions 01–05 be displaced from the Z axis such that a viewer looking through the viewable aperture from plane Q will not see these image generating components. Note that the lens components developing points 01 and 05 are displaced such that the image generators will not be seen. Similarly, the lens components generating focal positions 02–04 are displaced in a vertical sense such that they also are not viewable by the observer at eye stations 110 and 112.

The holographic multi-lens component plate 108 of FIG. 6 can be configured so as to generate a multi-zone arrangement where each zone is comprised of the binocular parallax outputs described at plane Q at 211–215. Looking to FIG. 7, the holographic plate 108 is again identified by that numeration in primed fashion. Plate 108' is configured such that the viewing zone 211–215 is replicated a number of times and the resulting zones are directed to a multitude of viewing stations, for example as represented at seating positions or operator stations 114–116. The capacity for such replications is available in number to the extent that the recording media generating the plate 108' is not saturated. With this arrangement, a viewer at viewing station 114 will seen in a binocular perspective, stereoscopic manner the imaging positions 211–215 in the same manner as viewed at plane Q in connection with FIG. 6. Similarly, a viewer seated at station 115 will see the same sequence of imaging positions 211–215 with the same three-dimensional effect and, in similar fashion, the viewer at seating or viewing station 116 will see that same image at the corresponding zone. Thus, a given three-dimensional image may be viewed from three different viewing stations or work stations. In an industrial design environment, this permits simultaneous inputs from a variety of configuration design specialists. In general, in forming the plate 108', a given point for each of the zones, i.e. point 215 at zone positions 114–116 are recorded simultaneously followed by a next optical position and the like through point 211. In effect, a total of five exposures on film generating plate 108' will achieve the requisite optical components. Thus, instead of saturating the recording media generating plate 108' with, for the instant example, 15 outputs and five inputs, each representing a single exposure, production can be carried out by recording a total of 15 outputs in five exposures. This may be achieved, recalling the discourse in connection with FIG. 3, by displacing a spatial filter at the appropriate length to record, for example, point 215 at zone 1. A separate spatial filter then is in a location of point 215 at zone 2 and a third spatial filter is at the location of point 215 in zone 3. The approach provides the advantage of recording to service multiple viewer seating facilities for theater types of utilization. For example, a substantial multitude of seating positions, each with a unique zone of view can be recorded while making a total of five exposures on the holographic film plate generating plate 108'. As before, it may be observed that the plate 108', as well as plate 108 represents a transmission holographic screen used with a set of image generating inputs and field lenses.

Figure 7:
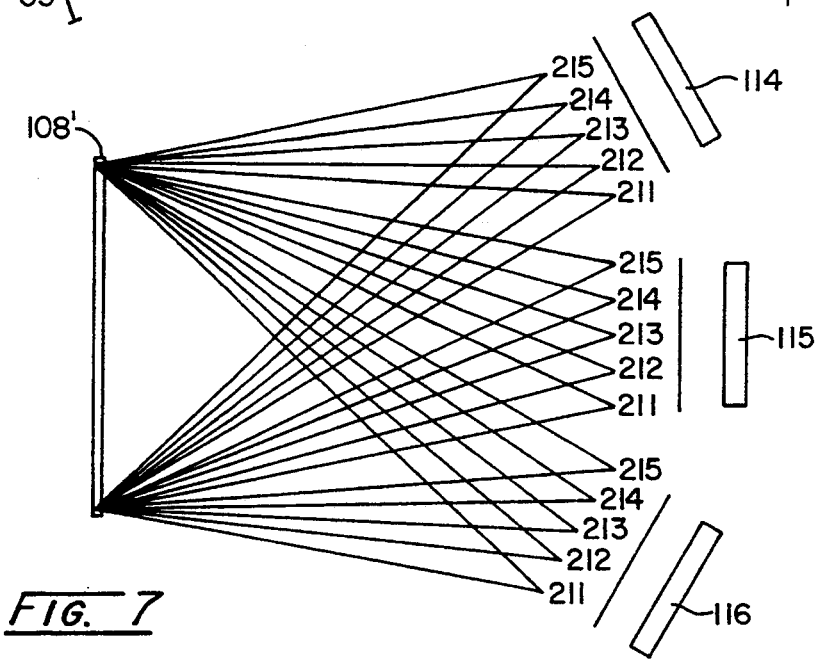
FIG. 7 illustrates a multi-zone output adaptation for the system of FIG. 6.

Referring to FIG. 8, the multi-position viewing architecture of FIG. 7 is described in more detail and in conjunction with a reflective viewing component which may, for example, have applications in the noted theater or work station environment. In the figure, video generated image components of a synthetic aperture generated scene are identified as A-E, the corresponding video signals from which are directed via inputs represented at 115-119 to video driver circuits represented at respective blocks 120-124. These driver circuits, in turn, drive cathode ray tubes or appropriate video output devices shown, respectively, at 126-130, thus generating images A-E. Drive association of the driver circuits 120-124 and respective imaging devices 126-130 are shown at respective lines 132-136. The image carrying output screens of devices 126-130 are oriented with the input back focal plane of the holographic lens components of a combiner holographic plate represented at 140. In this regard, the back focal input beam components for the optical elements of plate 140 with respect to the image inputs A-E are represented, respectively, at 142-146. Combiner plate 140, performing as above-described, locates correspondingly transmitted images A-E through beam array 150 to be received at the entrance optics of a conventional projection optical system represented generally at 152. In this regard, the images so projected to the entrance of optics 152 are represented, respectively, at A'-E'. Optical system 152 includes a focusing function as represented by the focusing element 154 and serves to project resultant binocular perspective image components as represented by beam 156 to a reflective holographic multi-viewer screen 158. Configured, as in the case of device 108 and 108' but with a reflective output, the screen then projects the five binocular perspective image components A-E, properly laterally spaced for interpupillary distance, to respective seating positions 160-165. In this regard, the screen 158 replicates the five binocular perspective views A-E as represented by respective projection beam peripheries 168-173. The corresponding optical axes for these beam peripheries 168-173 are represented, respectively, by dashed lines 176-181.

Looking to FIG. 8A, the disposition of binocular perspective images from sources A-E are represented for seating or viewing position 165, each being spaced one-half the common interpupillary distance for a human or about 3.5 cm.

Now considering the synthetic aperture based techniques for generating the images A-E of FIGS. 8 and 8A, reference is made to FIG. 9 where a physical object such as a model of an automobile 184 is positioned with respect to a centrally disposed Z axis 186. Imaging this subject 184 are color TV cameras 188-192 which are displaced in a horizontal plane and aligned in a plane, N, perpendicular to the Z axis 186. The outputs of these cameras 188-192 will carry, for example, the image information earlier described, respectively, at A-E, and presented at output lines 194-198. Each of the optics at the input of the cameras 188-192 is selected having the same optical characteristics, for example, F number, magnification, depth of field, and field of view. For the instant demonstration, the field of view of the cameras essentially encompass the image object 184 as represented by respective beam peripheries 200-204. Should the cameras 188-192 be spaced apart, for example such that their optical center lines were 7 cm apart, then any two of them will represent the same subtended angular binocular perspective of the human eyes. However, typically for film synthetic aperture holography, a rule of thumb exists wherein the separation of the two optical elements or recording positions should be about 25% of the forward distance to the object being imaged 184 along the Z axis. For example, if the spacing along the Z axis to the imaged object 184 were 10 feet, then the separation between cameras 188 and 189, 189 and 190, 190 and 191, and 191 and 192 would be 2½ feet. This rule of thumb evolved to provide a natural eye relief when looking at a small aperture display, for example, corresponding with a 4 in×5 in film hologram. Thus, the separation between the cameras 188 and 192 of the object 184 is adjusted for the above reasons in certain instances, as well as with respect to the intended reproduced scale of the resultant imaged object. However, a substantial latitude is afforded the subject of such imaging. For example, it may be desired to intentionally exaggerate imaging to enhance certain details of the three-dimensional image. In this regard, the separation between each of the two cameras can be increased beyond the rule of thumb or reduced, for example, three-dimensional aspects of a far distant view seen may be enhanced by alterations of camera spacing.

The positioning of the cameras 188-192 need to be along a singular plane and in alignment. For example, as represented in FIG. 10, the cameras may be equally spaced from the object 184 in a somewhat arcuate pattern. Additionally, inasmuch as a higher level of visual information is achieved by the addition of cameras, advantage may be gained by positioning the cameras in multiple vertical planes. For example, for the imaging of a model of an automobile four cameras may be placed floor level, four cameras at 2 feet high level and four cameras at a 5 feet high level. The advantage of having multiple altitudes or levels for the camera arrays is that there not only is achieved a side-to-side binocular parallax but also a vertical parallax. A viewer rising up in the seat or at a station may see a different vertical perspective with such inputs.

This same variation in imaging orientations also can be utilized in a theater environment where, for each seat or viewing station, the image presented to the viewer is essentially the same front row seat. Thus, the position of an attendee within the audience will have no bearing on the dimensional aspects or perspective of the image viewed.

The simplicity of the instant approach is apparent. With it, there is combined optically a multiplicity of perspective views evoked, for example, from video signals and generated as a synthetic aperture. No computation of fringe lines is involved utilizing high level computer systems nor is there a requirement for any electronic construction and reconstruction of the fringe components of a hologram. Now concerning the attributes of full color for the images achieved with the imaging approach of the invention, while holographic optics follow the laws or conditions of lens optics, they are, in effect, Fresnel zone plates exhibiting diffraction optics. Thus, the devices are wavelength sensitive. Without appropriate compensation, a red image will appear horizontally displaced from the corresponding blue or green image. Those colors are noted, inasmuch as most color cathode ray tubes (CRTs) are configured to perform in conjunction with red, green, and blue phosphors.

There are a variety of approaches to achieve a color image output utilizing holographic optics. In one approach, a full color target is employed with an optic bench which is successively illuminated with laser light in, for example, the three primary colors. Then, calculating fringe spacing resulting from labeling sensitivity, a necessary rotation of the holographic plate subsequent to each of the successive imaging steps can be determined and effected. Thus, the optics, when fed with light or full spectral light, the images generated with respect to the primary wavelengths will be superimposed. Difficulty exists, however, in that at a point along the earlier-noted z axis normal to the viewing plane, the observer will be able to see the superimposure. This applies to full color imagery.

For the case of pseudo color imaging, what appears to be a full color image may be recorded on holographic film by a single wavelength laser input. In a technique evolved by Denisyuk, the laser beam is employed to travel through the holographic film plate as a reference beam, strike a viewing object and then reflect back to the plate as an object beam. This creates a 180° intersection angle at the film plate recording interference fringe. The resulting fringe pattern acts as a tuned filter and replays, for example, imaging green light and reconstruction.

Another approach involves the phenomenon of the amorphous nature of holographic emulsions employed with holographic film plates. With the approach, the plates are pre-swelled to varying degrees with respect to each of the principal wavelengths and recordation is carried out during these increments of swelling to accommodate for wavelength variation. For example, in one approach, a holographic film plate is initially swollen by being soaked in a conventional wetting agent or surfactant for about five minutes. The plate then is removed from the wetting agent and squeegeed to dry the surface. The emulsion will remain swollen to this first extent when set-up within an optics table and exposed for the red component of the image using a standard red laser. The plate then is dismounted from the table and placed in a 15% solution of triethanolamine (TEA) and soaked for approximately five minutes. The emulsion of the plate will swell to a greater percent, whereupon it is squeegeed out to dry it and again positioned in a plate holder on an optics table. The expanded emulsion then is exposed with respect to only those objects with which recordation in green color is desired. The plate then is returned from the optical table and soaked again in a 35% solution of TEA for five minutes, whereupon it is squeegeed dry and replaced at the optics table. Those target objects of the scene which were to be reconstructed as blue in color then are exposed. In each case, between the exposures above described, the plate is rotated about 7°, for example, in an average set-up and is positioned with respect to a target distance of about 12 inches. Rotation in the instant use is about the center axis of the plate, observing it at its center. Following pre-swelling, exposure, and rotation, the plate can be developed and processed as is normal whereupon it is rinsed and dried thoroughly to allow the emulsion to return to its original size. However, the fringe patterns remain with respect to each of the exposures and three different sets of spatial frequencies are recorded on the entire plate. For additional information concerning color correction, reference is made to: "Practical Holography" (supra) pp 260–272.

Since certain changes may be made in the above-described system, method and apparatus without departing from the scope of the invention herein involved, it is intended that all matter contained in the description thereof or shown in the accompanying drawings shall be interpreted as illustrative and not in a limiting sense.

I claim:

1. A planar holographic film combiner component having a centrally disposed axis extending outwardly therefrom, and having at least two mutually superimposed holographic optical lens components thereon, said holographic optical lens components having back focal lengths extending to spaced apart image receiving positions offset from said axis an amount effective to avoid a view of objects thereat along a sighting path adjacent said axis, and having forward focal lengths extending generally oppositely with respect to said back focal lengths to mutually adjacent focal points spaced apart by an amount corresponding with one-half of the interpupillary distance between the eyes of a human to define an output aperture for generating a binocular parallax view of synthetic aperture derived images provided at said image receiving positions, each of said images being provided by an image generating display.

2. The combiner component of claim 1 in which said adjacent focal points are spaced apart about 3.5 cm.

3. The combiner component of claim 1 in which:
said image receiving positions are mutually spaced apart a distance effective to receive said synthetic aperture derived images from cathode ray tubes.

4. The combiner component of claim 1 in which said holographic optical lens components are constructed with correction for chromatic aberration.

5. An imaging system for stereoscopically imaging an array of at least two discrete synthetic aperture derived images of an object, comprising:
a first planar holographic film component having a centrally disposed axis extending outwardly normally thereto, and having at least two fringe pattern derived first optical components thereon with back focal lengths extending to spaced apart first image receiving positions located at predetermined positions offset from said axis for receiving said synthetic aperture derived images, and having forward focal lengths extending generally oppositely from said first optical components to first focal points spaced apart a first predetermined distance to define a first output aperture;
a second holographic film component having fringe pattern derived second optical components thereon corresponding in number with said first optical components, said second optical components having back focal lengths extending to second image receiving positions located to receive images transmitted by said first optical components at said first output aperture and having forward focal lengths extending from said second optical components to second focal points within a viewing aperture zone, said second optical components having a magnification factor with respect to said first predetermined distance to provide said second focal points at a lateral spacing corresponding with one-half of the interpupillar distance between the eyes of a human.

6. The imaging system of claim 5 in which said second holographic film component is configured to generate at least two said viewing aperture zones at spaced apart observing station locations.

7. The imaging system of claim 5 in which said fringe pattern derived second optical components of the second holographic film component are reflective and are configured to generate at least two said viewing aperture zones at spaced apart viewing station locations.

8. The imaging system of claim 5 including a field lens assembly having a focusing element and positioned intermediate said first and second holographic film components at a location for optically transmitting images at said first output aperture of said first holographic film component to said second image receiving positions of said second holographic film component.

9. The imaging system of claim 8 in which:
said first and second holographic film components are transmissive; and
said second holographic film component is configured to generate at least two said viewing aperture zones at spaced apart viewing locations.

10. The imaging system of claim 5 in which:
said fringe pattern derived second optical components of the second holographic film component are reflective and are configured to derive at least two said viewing aperture zones at spaced apart viewing station locations; and
including a projection lens assembly having a focusing element and positioned intermediate said first and second holographic components at a location for projecting images at said first output aperture of said first holographic component to said second image receiving positions of said second holographic film component.

11. The imaging system of claim 5 in which said lateral spacing of said second focal points is about 3.5 cm.

12. The imaging system of claim 5 in which said first predetermined distance between said first focal points is a value in centimeters equal to about 3.5 divided by said magnification factor.

13. The imaging system of claim 5 in which said first image receiving positions are offset from said axis an amount effective to avoid a view of objects thereat along a sighting path adjacent said axis from said first output aperture.

14. A method for generating a stereoscopic image of a subject, comprising the steps of:
generating a spatial sequence of a predetermined number of images of said subject from a corresponding spatial sequence of laterally spaced, select imaging positions, said spatial sequence of images defining a synthetic aperture;
providing a holographic film combiner component having a centrally disposed axis extending outwardly normally therefrom, and having a number of mutually superimposed holographic optical lens components corresponding with said predetermined number of images, said holographic optical lens components having back focal lengths extending to spaced apart image receiving positions offset from said axis, and having forward focal lengths extending generally oppositely with respect to said back focal lengths to mutually adjacent focal points at an output aperture spaced apart by an amount corresponding with one-half the interpupillary distance between the eyes of a human;
locating a viewing station at said output aperture; and
projecting said images from an image generating display simultaneously in said generated spatial sequence at a corresponding spatial sequence of said spaced apart image receiving positions to effect their corresponding projection at said output aperture.

15. The method of claim 14 in which:
said step for providing said holographic film combiner component includes the construction of said optical components with correction for chromatic aberration.

16. A method for generating a stereoscopic image of a subject, comprising the steps of:
generating a spatial sequence of a predetermined number of images of said subject from a corresponding spatial sequence of laterally spaced, select imaging positions, said spatial sequence of images defining a synthetic aperture;
forming a first holographic film component having a centrally disposed axis extending outwardly normally thereto, and having a number of first optical components corresponding with said predetermined number of images, said first optical components having back focal lengths extending to spaced apart image receiving positions offset from said axis and having forward focal lengths extending to focal points laterally spaced part in mutual adjacency by a first predetermined distance at a first output aperture;
forming a second holographic film component having a number of second optical components corresponding with said number of first optical components, said second optical components having back focal lengths extending to second image receiving positions and having forward focal lengths extending from said second optical components to second focal points within a viewing aperture zone, said second optical components having a magnification factor with respect to said first predetermined distance to provide said second focal points at a lateral spacing corresponding with one-half of the interpupillary distance between the eyes of a human;
positioning said second holographic film component to locate said second receiving positions for receiving images transmitted from said first optical components at said fast output aperture;
locating a viewing station at said viewing aperture zone; and
projecting said images simultaneously in said generated spatial sequence at a corresponding spatial sequence of said spaced apart first holographic film component image receiving positions to effect their corresponding presence at said viewing aperture zone.

17. The method of claim 16 in which:
said second holographic film component is formed having a configuration generating at least two said viewing aperture zones; and
said viewing station is located at each said zone.

18. The method of claim 17 in which said first and second holographic film components are formed as transmissive optical devices.

19. The method of claim 16 including the steps of providing a variable focus lens intermediate said first and second holographic film components; and transmitting therewith images at said first output aperture into said second image receiving positions.

20. The method of claim 16 in which:
said second optical components are formed as reflective optical component, and are configured to provide at least two said viewing aperture zones;
a further step is included, said step being the step of providing a projection lens assembly positioned intermediate said first and second holographic components at a location for projecting images at said first output aperture to said second image receiving positions; and
a viewing station is located at each said viewing aperture zones.

* * * * *